(12) United States Patent
Hansen

(10) Patent No.: US 8,662,251 B2
(45) Date of Patent: Mar. 4, 2014

(54) FALL PROTECTION FOR PERSONNEL SERVICING AN ELEVATED WORK AREA FROM A MAN LIFT

(75) Inventor: Randy J. Hansen, Grande Prairie (CA)

(73) Assignee: 1651661 Alberta Ltd., Grande Prairie, Alberta (CA)

( * ) Notice: Subject to any disclaimer, the term of this patent is extended or adjusted under 35 U.S.C. 154(b) by 282 days.

(21) Appl. No.: 13/024,751

(22) Filed: Feb. 10, 2011

(65) Prior Publication Data

US 2012/0080265 A1 Apr. 5, 2012

(30) Foreign Application Priority Data

Sep. 30, 2010 (CA) ...................................... 2716845

(51) Int. Cl.
*E04G 5/14* (2006.01)
(52) U.S. Cl.
USPC ........................................................ 182/113
(58) Field of Classification Search
USPC ............................ 182/113, 131; 187/250, 269
See application file for complete search history.

(56) References Cited

U.S. PATENT DOCUMENTS

| | | | | |
|---|---|---|---|---|
| 4,679,657 A | * | 7/1987 | Bennett et al. | 182/113 |
| 5,634,529 A | * | 6/1997 | Nguyen et al. | 182/113 |
| 5,967,258 A | * | 10/1999 | Scott et al. | 182/113 |
| 7,216,741 B2 | * | 5/2007 | MacDonald et al. | 182/113 |

OTHER PUBLICATIONS

Skyjack DC Electric Scissor Lifts pamphlet. Available at http://www.skyjack.com/sites/default/files/specifications/sjiii_3220.pdf. Available at least as early as Nov. 2010.
Saferack Truck Loading Platforms and Racks. Available at http://www.saferack.com/single-hatch-truck-loading-racks.cfm. Available at least as early as Jun. 2008.
Portable Fall Protection. Northern Platforms Ltd. Available at http://www.northernplatformsltd.ca/perpindicular.htm. Available at least as early as Jul. 2008.

* cited by examiner

*Primary Examiner* — Katherine Mitchell
*Assistant Examiner* — Kristine Florio
(74) *Attorney, Agent, or Firm* — Davis & Bujold, PLLC; Michael J. Bujold

(57) ABSTRACT

Fall protection for personnel servicing an elevated work area from a man lift. A bridge is pivotally mounted to a working edge of the man lift. The bridge pivots between a stored position and a substantially horizontal operative position. The bridge has a pivotally mounted edge, a remote edge opposite to the pivotally mounted edge and opposed sides. An expandable enclosure is anchored to the man lift. The enclosure is movable between a collapsed position and an expanded position. In the collapsed position, the enclosure is collapsed parallel to and provides fall protection along the working edge of the man lift. In the expanded position, the enclosure provides fall protection for the opposed sides of the bridge in the operative position and provides fall protection in the work area by enclosing a portion of the work area beyond the remote edge of the bridge.

4 Claims, 7 Drawing Sheets

FALL PROTECTION FOR PERSONNEL SERVICING AN ELEVATED WORK AREA FROM A MAN LIFT

FIELD

There is described fall protection for personnel servicing an elevated work area from a man lift. This fall protection was developed for use with respect to transport vehicles, but has wider application.

BACKGROUND

Whenever personnel must climb on top of a transport vehicle, such as a truck, trailer or rail car, during loading or when performing maintenance; there is a danger of a fall. There is a need for some form of safety device that will protect personnel from such a fall, without unduly limiting their mobility when performing their duties. Currently, a safety harness is worn by personnel, and an anchor is positioned at a fixed point adjacent the transport vehicle to which a lanyard can be used to suspend the safety harness from the anchor. Unfortunately, in most applications, there is not a suitable anchor point in the vicinity. Man lifts are often used to lift the personnel to the top of the transport vehicle, but it is usually difficult, if not impossible, to perform the required tasks from the safety of the man lift. A man lift is a piece of equipment used to elevate a worker on a working platform. The working platform is lifted by a lifting mechanism. A man lift is generally mobile and may be self-powered. One common type of man lift is a scissor lift. A modified, schematic version of a scissor lift is shown in FIG. 2.

SUMMARY

According to one aspect there is provided a combination that provides fall protection for personnel servicing an elevated work area from a man lift. A bridge is pivotally mounted to a working edge of the man lift. The bridge pivots between a stored position and a substantially horizontal operative position. The bridge has a pivotally mounted edge, a remote edge opposite to the pivotally mounted edge and opposed sides. An expandable enclosure is anchored to the man lift. The enclosure is movable between a collapsed position and an expanded position. In the collapsed position, the enclosure is collapsed parallel to and provides fall protection along the working edge of the man lift. In the expanded position, the enclosure provides fall protection for the opposed sides of the bridge in the operative position and provides fall protection in the work area by enclosing a portion of the work area beyond the remote edge of the bridge.

With the fall protection, as described above, the enclosure is expanded to encompass a portion of the work area. Service personnel need not be otherwise restrained and are able to move freely and safely within the enclosure.

According to another aspect of the invention there is provided a method of providing fall protection to personnel servicing an elevated work area from a man lift. The method involves pivotally mounting a bridge to a working edge of the man lift. The bridge pivots between a stored position and a substantially horizontal operative position. The bridge has a pivotally mounted edge, a remote edge opposite to the pivotally mounted edge and opposed sides. The method further involves anchoring an expandable enclosure to the man lift. The enclosure is movable between a collapsed position and an expanded position. In the collapsed position, the enclosure is collapsed parallel to and provides fall protection along the working edge of the man lift. In order to provide fall protection the bridge is moved to the operative position with the remote end resting upon the work area. The enclosure is then expanded to provide fall protection for the opposed sides of the bridge as well as for the work area by enclosing a portion of the work area beyond the remote edge of the bridge.

When this method is used with a transport vehicle, such as a fuel tanker, the enclosure can be used to enclose the roof mounted ports into which hoses carrying fuel must be inserted when filling the fuel tanker. Although it may not be practical to enclose the entirety of the work area at one time by moving the enclosure work can be done on the entirety of the work area a portion at a time. For example, if there are three roof mounted ports that must be accessed, the expandable enclosure may have to be moved three times; with one roof mounted port being enclosed each time.

It will be apparent that the same principles may be used to enclose work areas during construction or maintenance of buildings.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
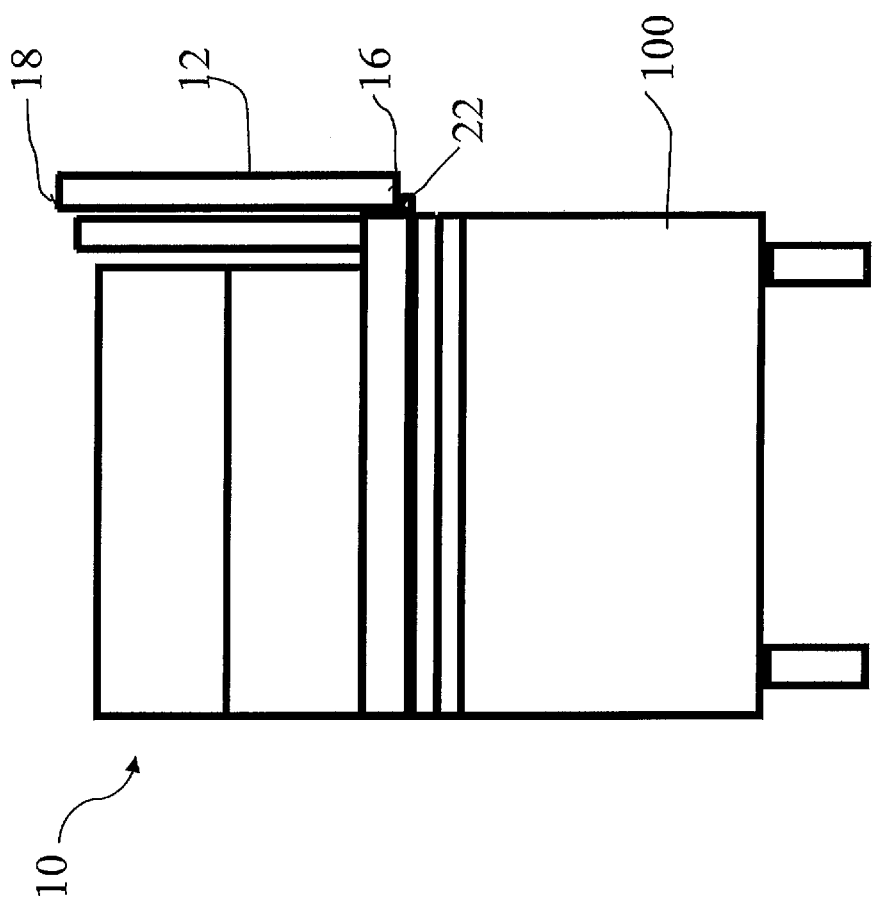
FIG. 1 is a side elevation view of a fall protection for personnel in a collapsed position.
Figure 2:
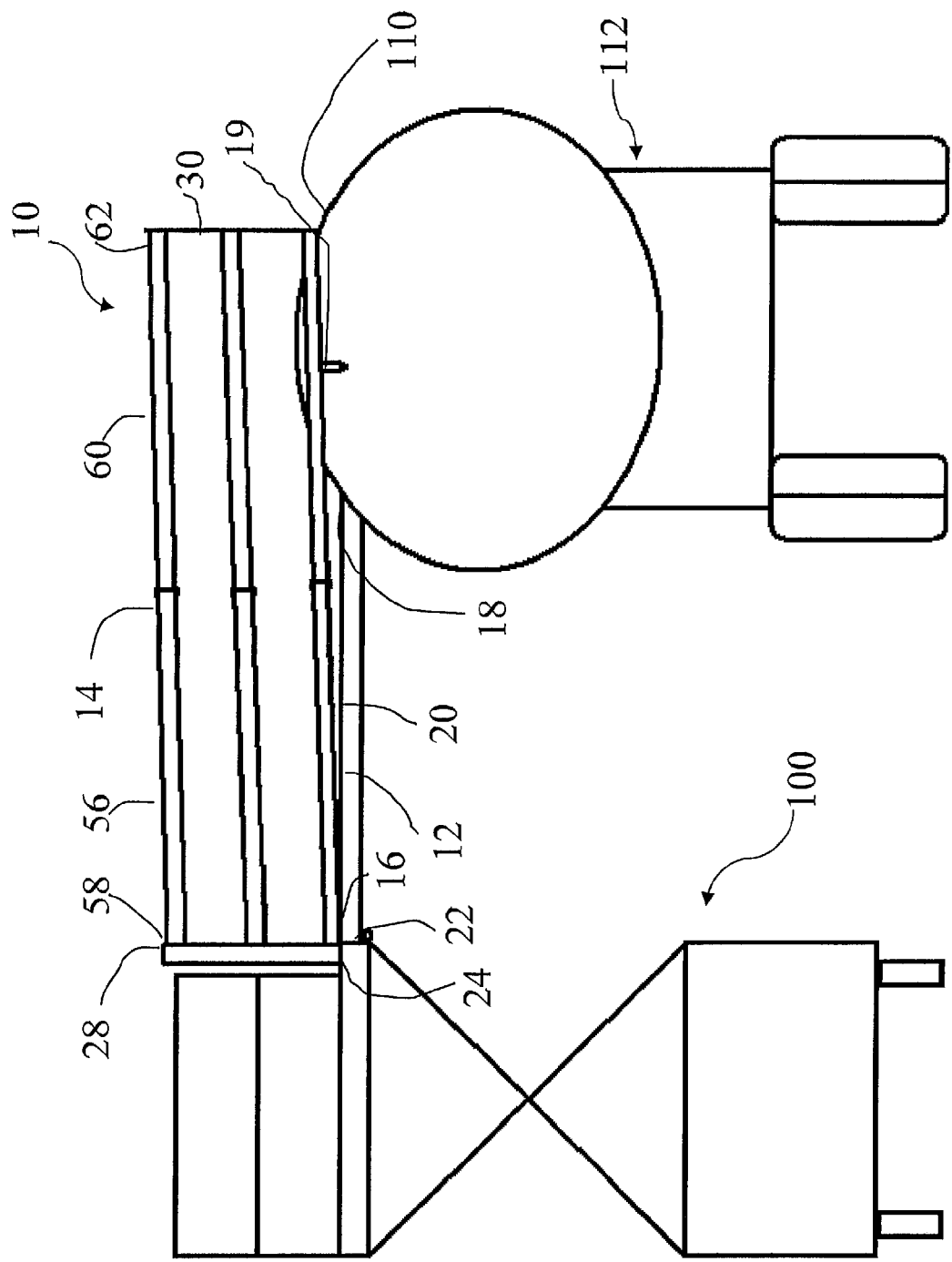
FIG. 2 is a side elevation view of the fall protection for personnel shown in FIG. 1 in an expanded position with a vehicle shown.
Figure 3:
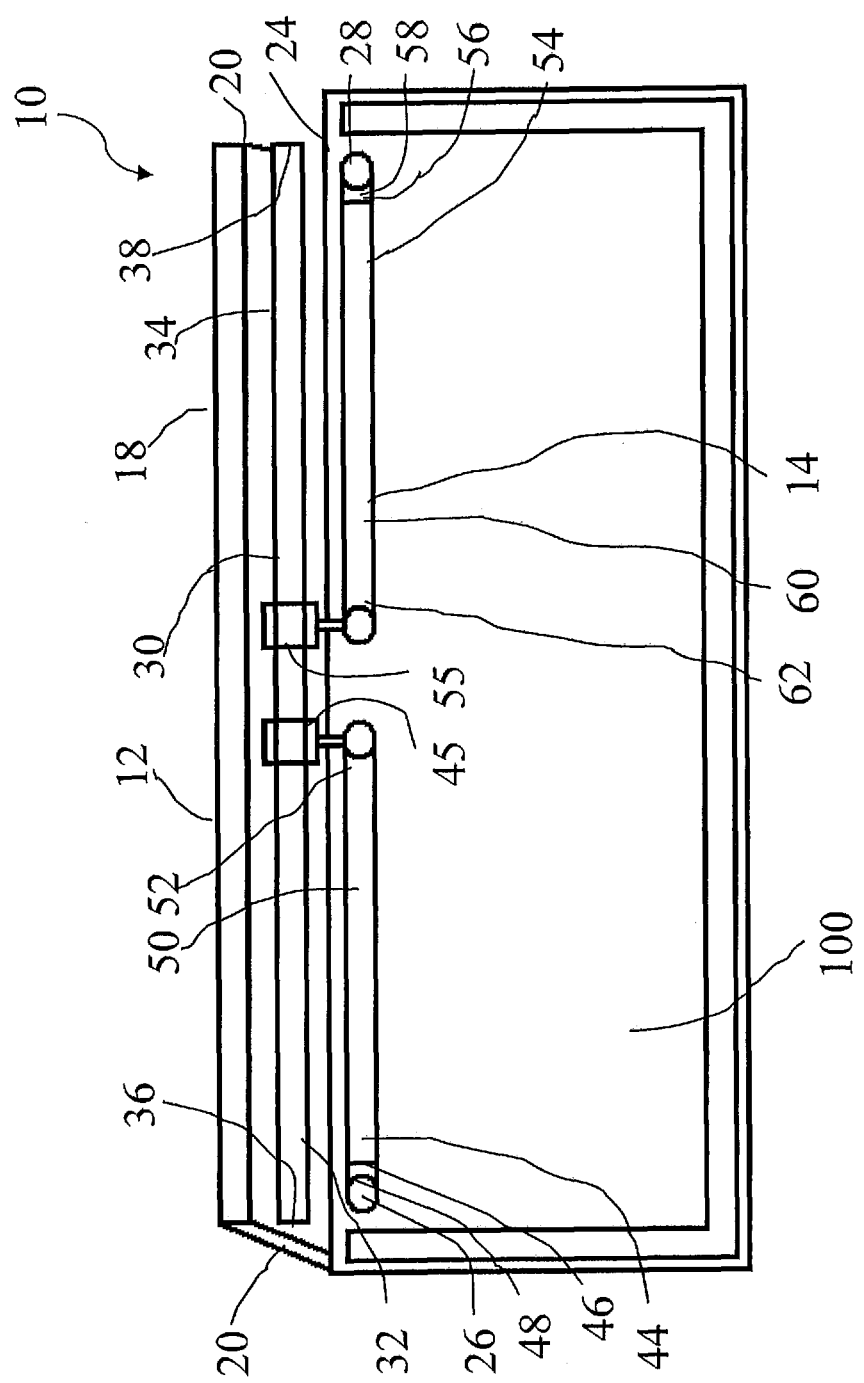
FIG. 3 is a top plan view of the fall protection for personnel shown in FIG. 1 in a collapsed position.
Figure 4:
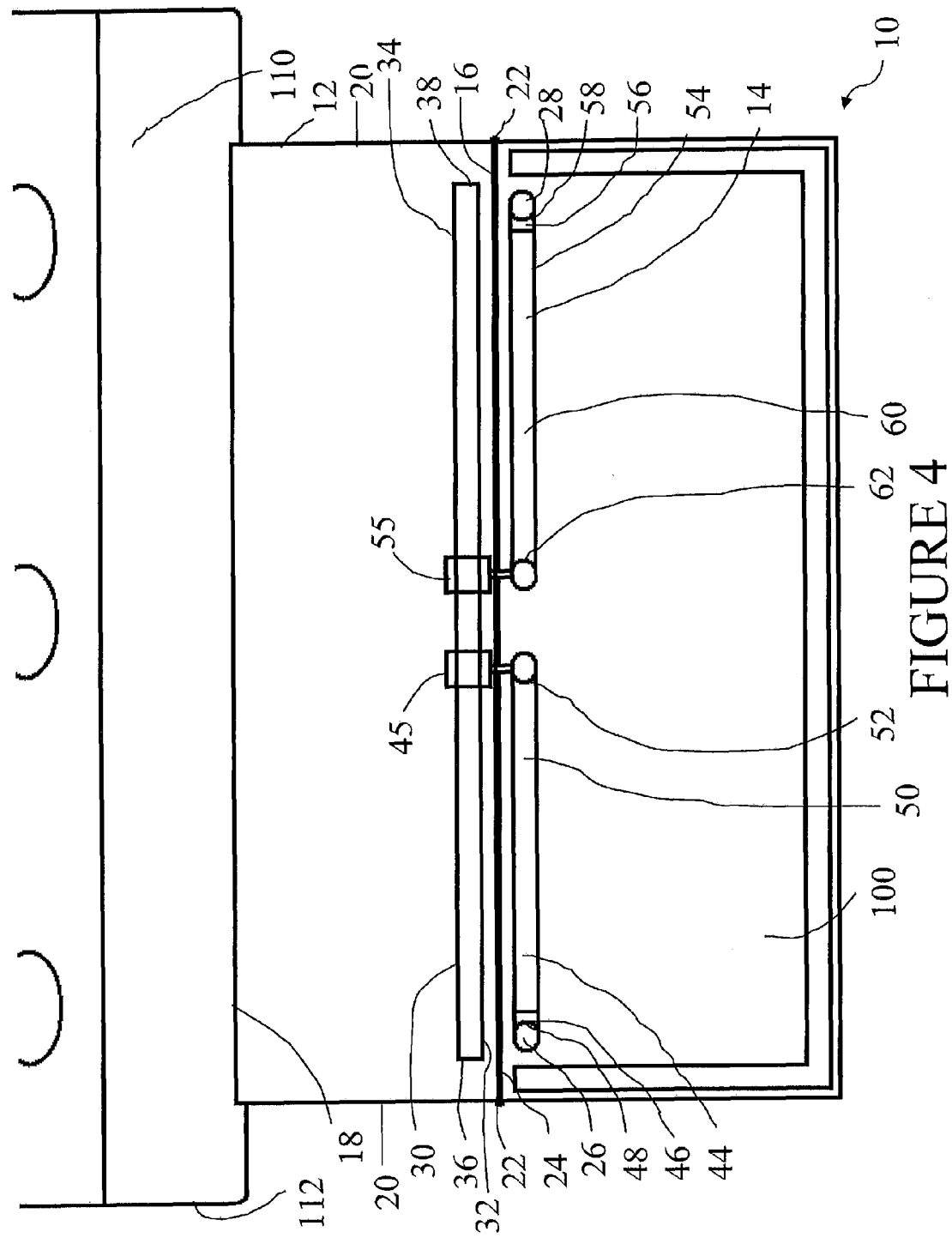
FIG. 4 is a top plan view of the fall protection for personnel shown in FIG. 3 with the bridge lowered.

Fall protection generally identified by reference numeral 10, for a man lift, generally identified by reference numeral 100 will now be described with reference to FIG. 1 through 7. Structure and Relationship of Parts:

Referring to FIG. 2, a fall protection 10 for personnel servicing an elevated work area from a man lift 100 includes a bridge 12 pivotally mounted to man lift 100 and an expandable enclosure 14 which is anchored to man lift 100. Bridge 12 pivots between a stored position, as illustrated in FIG. 1 and FIG. 3, and a substantially horizontal operative position, as illustrated in FIG. 2 and FIG. 4. Referring to FIG. 1, the stored position of bridge 12 as shown is substantially vertical, however it will be understood that bridge 12 may also be stored at an angle. Referring to FIG. 2, bridge 12 has a pivotally mounted edge 16, a remote edge 18 opposite to pivotally mounted edge 16 and opposed sides 20. As shown, bridge 12 is pivotally mounted to man lift 100 by a hinge 22, however it will be understood that bridge 12 may be connected to man lift 100 by any suitable pivoting mount.

Figure 7:
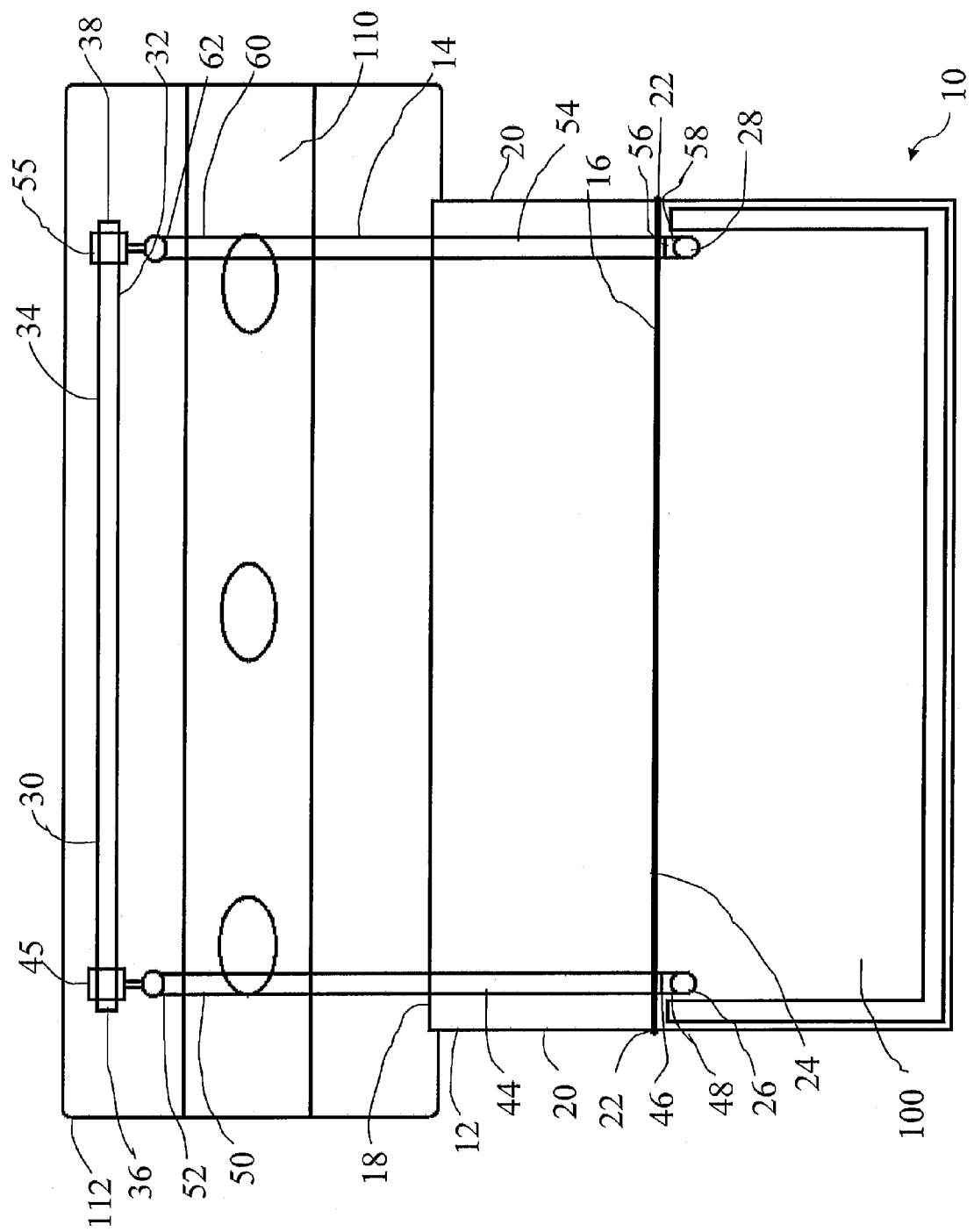
FIG. 7 is a top plan view of the fall protection for personnel shown in FIG. 3 in an expanded position.

Expandable enclosure 14 is anchored to man lift 100 and is movable between a collapsed position illustrated in FIG. 1 and FIG. 3, and an expanded position illustrated in FIG. 2 and FIG. 7. Referring to FIG. 3, in the collapsed position, enclosure 14 is collapsed parallel to and provides fall protection along working edge 24 of man lift 100. Referring to FIG. 2 and FIG. 7, in the expanded position, enclosure 14 provides fall protection for opposed sides 20 of bridge 12 in the operative position and provides fall protection by enclosing a portion of the work area, shown as the top 110 of a tanker truck trailer 112, beyond remote edge 18 of bridge 12. Expandable enclosure 14 consists of a first support post 26 at one side of working edge 24 of man lift 100 and a second support post 28 on an opposed side of working edge 24. A vertical end barrier 30 has an inside face 32, an outside face 34, a first end 36 and a second end 38 and is positioned parallel to working edge 26. First end 36 is positioned on a vertical plane common with first support post 26 and second end 38 is positioned on a vertical plane common with second support post 28.

Referring to FIG. 7, a telescopically expandable vertical first side barrier 44 connects first support post 26 with end barrier 30. First side barrier 44 has a collar 45 attached to second end 52 that connects to end barrier 30 and allows for movement of first side barrier 44 along the length of end barrier 30. First side barrier 44 has a first portion 46 with a first end 48 and a second portion 50 with a second end 52. First portion 46 and second portion 50 are capable of telescopic movement between an extended position, shown in FIG. 7, and a retracted position, shown in FIG. 6. It will be understood that first and second portions 46 and 50 may be allowed to extend further with additional telescope components, such as multiple nested lengths of tubing. First end 48 is pivotally mounted to first support post 26 and first side barrier 44 swings about first support post 26 from a position parallel to working edge 24, shown in FIG. 3, to a position perpendicular to working edge 24, shown in FIG. 6. Referring to FIG. 7, second end 52 of second portion 50 is pivotally secured to and movable along inside face 32 of end barrier 30 from an outside position perpendicular to inside face 32 at first end 48 to, referring to FIG. 3, an inside position spaced from first end 48 with first side barrier 44 parallel to inside face 32 and in face to face relation with end barrier 30.

Referring to FIG. 7, a telescopically expandable vertical second side barrier 54 connects second support post 28 with end barrier 30. Second side barrier 54 has a collar 55 attached to second end 62 that connects to end barrier 30 and allows for movement of second side barrier 54 along the length of end barrier 30. Second side barrier 54 has a first portion 56 with a first end 58 and a second portion 60 with a second end 62. First portion 56 and second portion 60 are capable of telescopic movement between an extended position, shown in FIG. 7 and a retracted position, shown in FIG. 6. First end 58 is pivotally mounted to second support post 28 and second side barrier 54 swings about second support post 28 from a position parallel to working edge 24, shown in FIG. 3, to a position perpendicular to working edge 24, shown in FIG. 6. Referring to FIG. 7, second end 62 of second portion 60 is pivotally secured to and movable along inside face 32 of end barrier 30 from an outside position perpendicular to inside face 32 at second end 62 referring to FIG. 3, to an inside position spaced from second end 62 with second side barrier 54 parallel to inside face 32 and in face to face relation with end barrier 30.

Referring to FIG. 2, each of first side barrier 44 and second side barrier 54 have a foot 19 which contacts top 110 of truck trailer 112 when in an extended position. Foot 19 helps to prevent sideways movement of first side barrier 44 and second side barrier 54 when in contact with top 110 of truck trailer 112.

Operation:

Referring to FIG. 1, fall protection 10 is in a stored position with bridge 12 pivoted into a vertical position. Referring to FIG. 3, expandable enclosure 14 begins in a retracted position. First side barrier 44 and second side barrier 54 are parallel to working edge 24 of man lift 100 and end barrier 30 is also in a parallel position to working edge 24. Bridge 12 is positioned in a vertical stored position.

Figure 5:
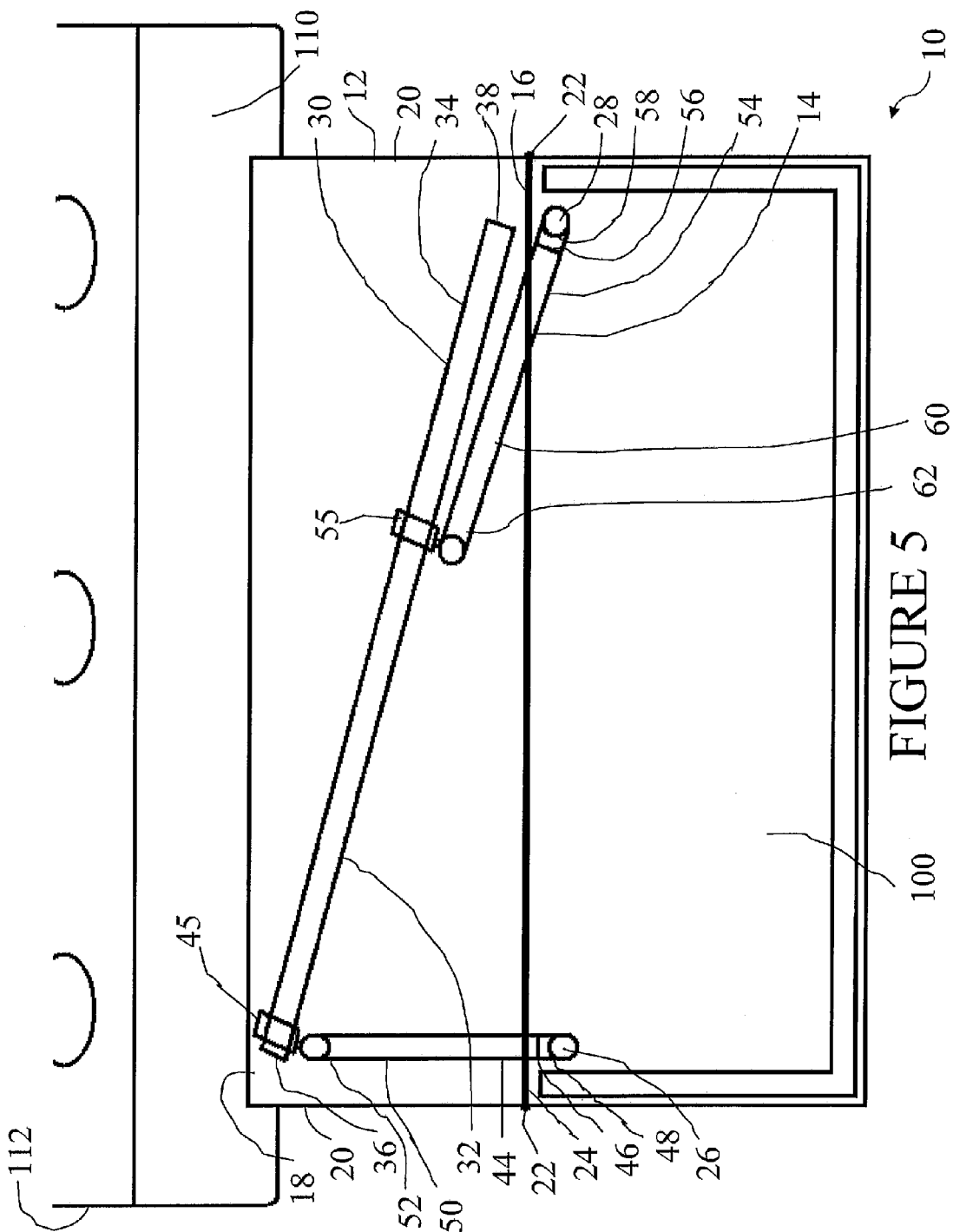
FIG. 5 is a top plan view of the fall protection for personnel shown in FIG. 3 with the first side pushed out.
Figure 6:
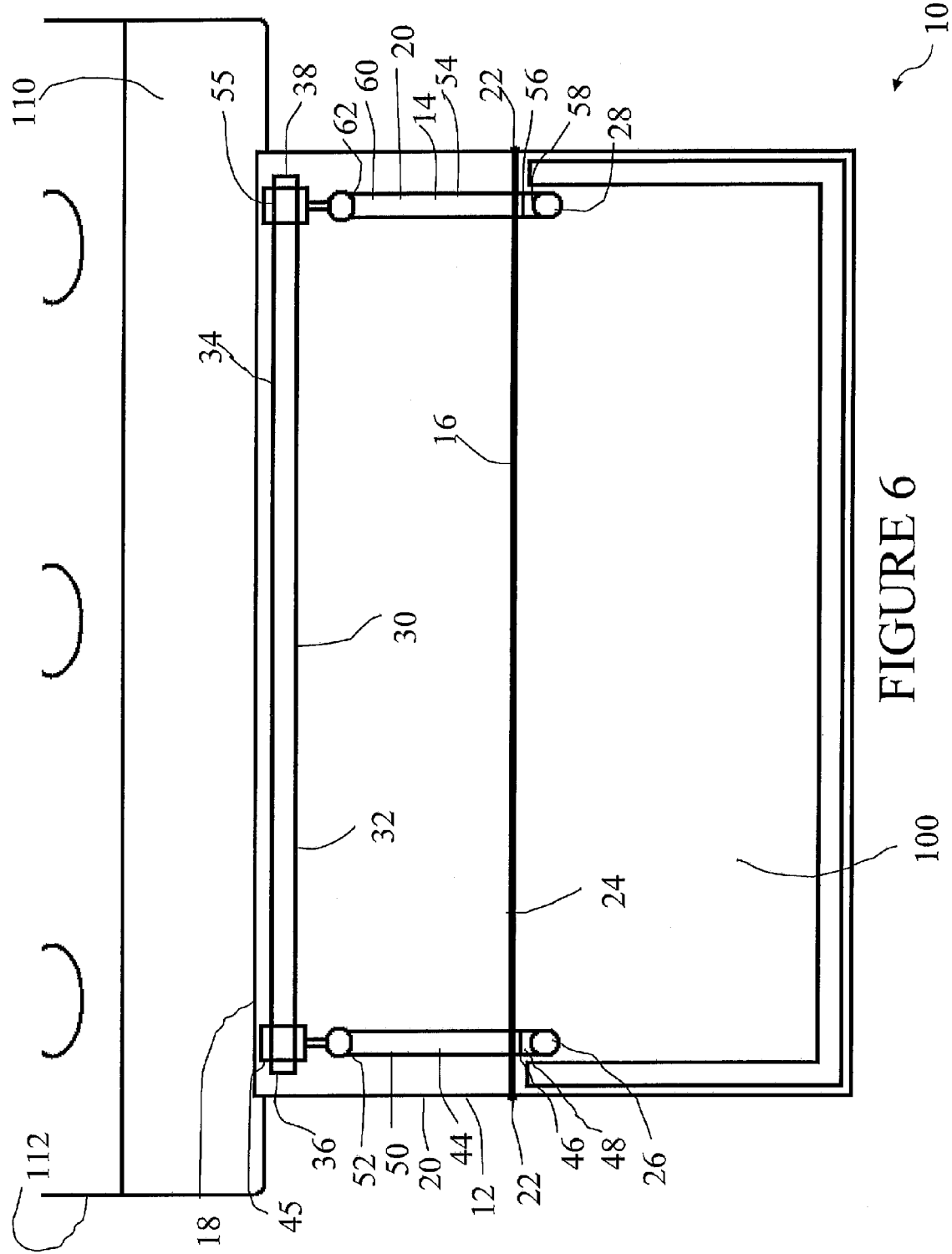
FIG. 6 is a top plan view of the fall protection for personnel shown in FIG. 3 with first and second side pushed out.

Referring to FIG. 4, man lift 100 is raised above top 110 truck trailer 112 prior to bridge 12 being pivoted into an operating position. Bridge 12 is pivoted on hinge 22 into an operating position such that remote edge 18 contacts the top 110 of a truck trailer 112 Man lift 100 is lowered until bridge 12 sits horizontally on truck trailer 112. Referring to FIG. 5, first side barrier 44 is pivoted on first support post 26 to a position perpendicular to working edge 24 of man lift 100. This movement causes second end 52 of first side barrier 44 to move along end barrier 30 and causes end barrier 30 to be angled between first side barrier 44 and second side barrier 54. Referring to FIG. 6, second side barrier 54 is pivoted on second support post 28 to a position perpendicular to working edge 24 of man lift 100. Second end 62 of second side barrier 54 moves along end barrier 30. End barrier 30 is now in a position parallel to remote edge 18 of bridge 12. Referring to FIG. 7, first side barrier 44 and second side barrier 54 are telescopically extended such that end barrier is moved onto top 110 of truck trailer 112 and encloses an area in which a user may safely work. First side barrier 44 and second side barrier 54 are locked into the telescopic position to prevent movement of end barrier 30 towards or away from man lift 100. First side barrier 44 and second side barrier 54 may be locked in several different ways, including clamping barriers 44 and 54 at the desired length. It should be understood that any suitable locking mechanism may be used to lock first side barrier 44 and second side barrier 54 into the telescopic position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. Fall protection for personnel servicing an elevated work area comprising in combination:
   a man lift comprising a chassis having wheels, an enclosed rectangular working platform and a lifting mechanism that lifts the enclosed working platform vertically above the chassis;
   a bridge pivotally mounted to a working edge of the working platform of the man lift, the bridge pivoting between a substantially vertical stored position and a substantially horizontal operative position, the bridge having a pivotally mounted edge, a remote edge opposite to the pivotally mounted edge and opposed sides;

an expandable enclosure anchored to the man lift, the enclosure being movable between a collapsed position and an expanded position, in the collapsed position the enclosure is collapsed parallel to and provides fall protection along the working edge of the man lift and in the expanded position the enclosure provides fall protection for the opposed sides of the bridge in the operative position and provides fall protection by enclosing a portion of the work area beyond the remote edge of the bridge, the bridge in the stored position being adjacent to the expandable enclosure in the collapsed position such that the expandable enclosure is positioned between the working platform and the bridge and such that the bridge prevents the expandable enclosure from moving to the expanded position.

2. Fall protection for personnel servicing an elevated work area, comprising in combination:

a bridge pivotally mounted to a working edge of the working platform of the man lift, the bridge pivoting between a stored position and a substantially horizontal operative position, the bridge having a pivotally mounted edge, a remote edge opposite to the pivotally mounted edge and opposed sides;

an expandable enclosure anchored to the man lift, the enclosure being movable between a collapsed position and an expanded position, in the collapsed position the enclosure is collapsed parallel to and provides fall protection along the working edge of the man lift and in the expanded position the enclosure provides fall protection for the opposed sides of the bridge in the operative position and provides fall protection by enclosing a portion of the work area beyond the remote edge of the bridge;

wherein the expandable enclosure is comprised of:

a first support post at one side of the working edge of the working platform and a second support post on an opposed side of the working edge;

a vertical end barrier positioned parallel to the working edge, the end barrier having an inside face, an outside face, an end barrier first end and an end barrier second end, the end barrier first end being positioned on a vertical plane common with the first support post and the end barrier second end being positioned on a vertical plane common with the second support post;

a telescopically expandable vertical first side barrier connecting the first support post with the end barrier, the first side barrier having a first portion with a first side barrier first end and a second portion with a first side barrier second end, the first portion and the second portion being capable of telescopic movement between an extended position and a retracted position, the first side barrier first end being pivotally mounted to the first support post, the first side barrier swinging about the first support post from a position parallel to the working edge to a position perpendicular to the working edge, the first side barrier second end of the second portion being pivotally secured and movable along the inside face of the end barrier from an outside position perpendicular to the inside face at the first side barrier first end to an inside position spaced from the first side barrier first end with the first side barrier parallel to the inside face and in face to face relation with the end barrier; and a telescopically expandable vertical second side barrier connecting the second support post with the end barrier, the second side barrier having a first portion with a second side barrier first end and a second portion with a second side barrier second end, the first portion and the second portion being capable of telescopic movement between an extended position and a retracted position, the second side barrier first end being pivotally mounted to the second support post, the second side barrier swinging about the second support post from a position parallel to the working edge to a position perpendicular to the working edge, the second side barrier second end of the second portion being pivotally secured and movable along the inside face of the end barrier from an outside position perpendicular to the inside face at the second side barrier second end to an inside position spaced from the second side barrier second end with the second side barrier parallel to the inside face and in face to face relation with the end barrier.

3. Fall protection for personnel servicing an elevated work area from a man lift, comprising in combination:

a man lift comprising a chassis having wheels, an enclosed, rectangular working platform and a lifting mechanism that lifts the enclosed working platform vertically above the chassis, the working platform having a length and a width that is less than the length;

a bridge pivotally mounted to a working edge oriented along the length of the working platform of the man lift, the bridge pivoting between a stored position and a substantially horizontal operative position, the bridge having a pivotally mounted edge, a remote edge opposite to the pivotally mounted edge and opposed sides, in the operative position pivotally mounted edge being attached to the working platform and the remote edge extending out from the working platform;

an expandable enclosure anchored to the man lift, the enclosure being movable between a collapsed position and an expanded position, in the collapsed position the enclosure is collapsed parallel to and provides fall protection along the working edge of the man lift and in the expanded position the enclosure extends out past the working edge of the working platform and provides fall protection for the opposed sides of the bridge in the operative position and provides fall protection by enclosing a portion of the work area beyond the remote edge of the bridge.

4. A method of providing fall protection to personnel servicing an elevated work area, the method comprising the steps of:

providing a man lift comprising a chassis having wheels, an enclosed rectangular working platform and a lifting mechanism that lifts the enclosed working platform vertically above the chassis, the man lift being supported solely by its wheels;

pivotally mounting a bridge to a working edge of the man lift, the bridge pivoting between a substantially vertical stored position and a substantially horizontal operative position, the bridge having a pivotally mounted edge, a remote edge opposite to the pivotally mounted edge and opposed sides;

anchoring an expandable enclosure to the man lift, the enclosure being movable between a collapsed position and an expanded position, in the collapsed position the enclosure is collapsed parallel to and provides fall protection along the working edge of the man lift and is positioned between the work platform and the bridge when the bridge is in the stored position;

moving the bridge to the operative position with the remote end resting upon the work area; and expanding the enclosure to provide fall protection for the opposed sides of the bridge as well as providing fall protection in the work area by enclosing a portion of the work area beyond the remote edge of the bridge.

* * * * *